(12) United States Patent
Yang et al.

(10) Patent No.: US 12,104,566 B2
(45) Date of Patent: Oct. 1, 2024

(54) METHOD AND DEVICE FOR DETERMINING SUCTION HEIGHT OF VARIABLE SPEED UNITS

(71) Applicant: CHINA THREE GORGES CORPORATION, Wuhan (CN)

(72) Inventors: Jing Yang, Wuhan (CN); Xiquan Liu, Wuhan (CN); Zubing Zou, Wuhan (CN); Yong Sun, Wuhan (CN); Zhe Ma, Wuhan (CN); Yuan Gao, Wuhan (CN); Peng Li, Wuhan (CN); Fangzheng Wang, Wuhan (CN); Zhe Li, Wuhan (CN)

(73) Assignee: CHINA THREE GORGES CORPORATION (CN)

( * ) Notice: Subject to any disclaimer, the term of this patent is extended or adjusted under 35 U.S.C. 154(b) by 0 days.

(21) Appl. No.: 18/342,981

(22) Filed: Jun. 28, 2023

(65) Prior Publication Data
US 2024/0003327 A1    Jan. 4, 2024

(30) Foreign Application Priority Data
Jul. 4, 2022    (CN) .......................... 202210777346.7

(51) Int. Cl.
*F03B 15/08* (2006.01)
*F03B 11/04* (2006.01)
*F03B 15/14* (2006.01)

(52) U.S. Cl.
CPC .............. *F03B 15/08* (2013.01); *F03B 15/14* (2013.01); *F03B 11/04* (2013.01)

(58) Field of Classification Search
CPC ......... F03B 15/08; F03B 15/14; F03B 11/04; F03B 13/06; Y02E 10/20; Y02E 60/16
See application file for complete search history.

(56) References Cited

U.S. PATENT DOCUMENTS

| | | | | |
|---|---|---|---|---|
| 2013/0269817 A1* | 10/2013 | Okihara | ................ | F04D 29/669 138/39 |
| 2017/0314527 A1* | 11/2017 | Sakamoto | ............... | F03B 15/08 |
| 2023/0081667 A1* | 3/2023 | Alkad | ................ | F04D 15/0254 417/36 |

* cited by examiner

*Primary Examiner* — Elton K Wong

(57) ABSTRACT

A method and device for determining a suction height of a variable speed unit is provided. The method includes: acquiring a reference cavitation coefficient and a reference specific rotation speed parameter corresponding to a target water head section in a preset number of power stations; conducting calculations on the reference cavitation coefficient and the reference specific rotation speed parameter by utilizing a target scheme to obtain a target formula; acquiring a maximum lift, a minimum lift, a speed variation range and a synchronous rotation speed value of a current target variable speed unit and input force values of the target variable speed unit at a plurality of key working condition points; and determining a target suction height of the target variable speed unit.

6 Claims, 2 Drawing Sheets

METHOD AND DEVICE FOR DETERMINING SUCTION HEIGHT OF VARIABLE SPEED UNITS

CROSS-REFERENCE TO RELATED APPLICATIONS

This application claims priority to Chinese Application No. 202210777346.7, having a filing date of Jul. 4, 2022, the entire contents of which are hereby incorporated by reference.

FIELD

The present application relates to the field of pumped storage engineering, in particular to a method and a device for determining a suction height of a variable speed unit, electronic equipment and a storage medium.

BACKGROUND

A pumped storage power station is the most mature and flexibly adjustable power supply capable of being used on a large scale and can play an important role in construction of a novel electrical power system.

To ensure the operation performance and stability of units after a power station is put into operation, a pumped storage unit is required to ensure not to generate cavitation within an operating range in the design process. Actually the power station guarantees cavitation-free operation according to the reasonable suction height. Based on considering cavitation-free operation of a water pump turbine, civil engineering excavation investment is reduced as much as possible, and further, the reasonable suction height is determined to be an important content of the primary design of the power station. At the design stage of the power station, civil engineering construction is usually carried out before unit bidding. Generally, there are no actual operation unit parameters or curves provided by a manufacturer. The suction height of the water pump turbine needs to be estimated according to statistical data or an empirical formula of cavitation coefficients of an existing unit. Because the cavitation performance of the water pump turbine is worse than that of a water turbine when the water pump turbine operates under a water pumping working condition, cavitation design is generally determined by referring to the statistical relationship of the water pumping working condition and the specific rotation speed and combining design experience, civil engineering investment and other comprehensive comparison and selection.

However, a constant-speed unit is mostly used when a pumped storage power station is built at present. Existing calculation formulas of cavitation coefficients of constant-speed water pump turbines are all derived from old statistical formulas. Calculation results can not reflect progresses of unit design and research and development technologies in recent years, and scheme argumentation, parameter optimization and hydraulic research and development during the preliminary design of a unit can not be well guided.

To further improve the flexibility of the pumped storage power station, domestic development, production and application of a variable speed pumped storage unit with faster and more flexible adjusting performance become a hot spot of pumped storage innovation application. However, there is no reliable calculation method for the cavitation coefficient and the suction height of the variable speed unit. If an existing method for determining a cavitation coefficient of a constant-speed unit is applied to the design of the variable speed unit, the following problems exist: firstly, calculation results of an existing empirical formula can not reflect the progress of the unit design and the research and development technologies in recent years and can not more accurately reflect the scheme argumentation, parameter optimization and hydraulic research and development during preliminary design of the unit of the water head section; and secondly, an operating range of the variable speed unit is wide, the requirement for a cavitation index is higher, and a calculation formula of the constant-speed unit can not meet current demands.

SUMMARY

The present application provides a method and a device for determining a suction height of a variable speed unit, electronic equipment and a storage medium to at least solve the problems that calculation results are inaccurate and current calculation demands of cavitation indexes can not be met in the related art.

According to one aspect of an embodiment of the present application, a method for determining a suction height of a variable speed unit is provided, which comprises:

acquiring a reference cavitation coefficient and a reference specific rotation speed parameter corresponding to a target water head section in a preset number of power stations;

conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;

acquiring a maximum lift, a minimum lift, a speed variation range and a synchronous rotation speed value of a current target variable speed unit and input force values of the target variable speed unit at a plurality of key working condition points; and determining a target suction height of the target variable speed unit according to the maximum lift, the minimum lift, the speed variation range, the synchronous rotation speed value, the input force values at the plurality of key working condition points and the target formula.

According to another aspect of the embodiment of the present application, a device for determining a suction height of a variable speed unit is also provided, which comprises:

a first acquisition module for acquiring a reference cavitation coefficient and a reference specific rotation speed parameter corresponding to a target water head section in a preset number of power stations;

a calculation module for conducting calculations on a reference cavitation coefficient and a reference specific rotation speed parameter by utilizing a target scheme to obtain a target formula, wherein the target formula is used for obtaining a statistical relationship between a cavitation coefficient and a specific rotation speed;

a second acquisition module for acquiring a maximum lift, a minimum lift, a speed variation range and a synchronous rotation speed value of a current target variable speed unit and input force values of the target variable speed unit at a plurality of key working condition points; and a determination module for determining a target suction height of the target variable speed unit according to the maximum lift, the minimum lift, the speed variation range, the synchronous rotation speed value, the input force values at the plurality of key working condition points and the target formula.

Optionally, the calculation module comprises:

a calculation unit for conducting calculations on the reference cavitation coefficient and the reference specific speed parameter by utilizing the target scheme to obtain a first formula;

a first acquisition unit for acquiring a plurality of preset formulas, wherein the preset formulas are existing calculation formulas for obtaining the statistical relationship between the cavitation coefficient and the specific rotation speed; and and the plurality of preset formulas to select the target formula from the first formula and the plurality of preset formulas.

Optionally, the comparison unit comprises:

a first determination submodule for determining a corresponding first standard deviation according to the first formula;

a second determination submodule for determining a preset standard deviation corresponding to each preset formula according to the plurality of preset formulas; and a comparison submodule for numerically comparing the first formula to the preset standard deviation, and selecting the obtained formula with the minimum standard deviation as the target formula.

Optionally, the second acquisition module comprises:

a second acquisition unit for acquiring the maximum lift, the minimum lift, the speed variation range and the synchronous rotation speed value; and a first determination unit for determining the input force values of the plurality of key working condition points according to the speed variation range, the synchronous rotation speed value and a preset relationship, wherein the preset relationship is used for indicating the input force of the target variable speed unit to be in direct proportion to the third power of the rotation speed value.

Optionally, the determination module comprises:

a second determination unit for determining flow values of the target variable speed unit at the plurality of key working condition points according to the input force values at the plurality of key working condition points;

an obtaining unit for obtaining a specific rotation speed value at each key working condition point according to the flow value under each key working condition, the maximum lift, the minimum lift, the synchronous rotation speed value and the speed variation range; and a third determination unit for determining the target suction height according to the specific rotation speed value at each key working condition point and the target formula.

Optionally, the third determination unit comprises:

a third determination submodule for determining a first cavitation coefficient maximum value corresponding to the maximum lift within the speed variation range and a second cavitation coefficient maximum value corresponding to the minimum lift within the speed variation range according to the specific rotation speed value at each key working condition point target formula;

a first obtaining submodule for obtaining a suction height minimum value according to the first cavitation coefficient maximum value, the second cavitation coefficient maximum value and a suction height calculation formula; and a second obtaining submodule for obtaining the target suction height according to the suction height minimum value.

Optionally, the second obtaining submodule comprises:

an acquisition subunit for acquiring a preset margin value, wherein the preset margin value is used for numerically adjusting the suction height minimum value within a preset range; and a determination subunit for determining the target suction height according to the suction height minimum value and the preset margin value.

According to yet another aspect of the embodiment of the present application, electronic equipment is further provided and comprises a processor, a communication interface, a memory and a communication bus, wherein the processor, the communication interface and the memory communicate with each other through the communication bus; the memory is configured to store a computer program; and the processor is configured to perform method steps in any aforementioned embodiment by running the computer program stored in the memory. For example, the device, modules and units mentioned above can be realized by the computer, all the functions of the device, modules and units are realized or performed by the processor of the computer.

According to yet another aspect of the embodiment of the present application, a computer-readable storage medium is further provided. A computer program is stored in the storage medium, wherein the computer program is used for performing method steps in any aforementioned embodiment when run.

In the embodiment of the present application, obtain a reference cavitation coefficient and a reference specific rotation speed parameter corresponding to a target water head section in a preset number of power stations; conduct calculations on the reference cavitation coefficient and the reference specific rotation speed parameter by utilizing a target scheme to obtain a target formula, wherein the target formula is used for obtaining the statistical relationship between a cavitation coefficient and a specific rotation speed; acquire a maximum lift, a minimum lift, a speed variation range and a synchronous rotation speed value of a current target variable speed unit and input force values of the target variable speed unit at a plurality of key working condition points; and determine a target suction height of the target variable speed unit according to the maximum lift, the minimum lift, the speed variation range, the synchronous rotation speed value and the input force values at the plurality of key working condition points. Because the embodiment of the present application considers data from the pumped storage power station which is put into production in the target water head section where the variable speed unit is located, the statistical relationship between the cavitation coefficient and the specific rotation speed of the pumped storage unit at the water head section is obtained by adopting the target scheme, the cavitation coefficient of the pumped storage power station at the water head section can be estimated preliminarily and more accurately, the influence of variation of the variable speed operating range of the variable speed unit on cavitation is taken into account, and the cavitation coefficient and the suction height of the variable speed pumped storage unit power station are calculated more accurately. Compared with an existing design method adopting the constant-speed unit, the requirement of the variable speed unit on cavitation-free operation can be better met, and reliable technical support is provided for subsequent construction of the variable speed pumped storage power station.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

To explain the embodiments of the present application or the technical solutions in the prior art more clearly, the accompanying drawings required by the embodiments of the present application or description in the prior art are introduced briefly below. Obviously, those skilled in the art can also obtain other accompanying drawings based on the accompanying drawings without paying a creative work.

DETAILED DESCRIPTION

Figure 1:
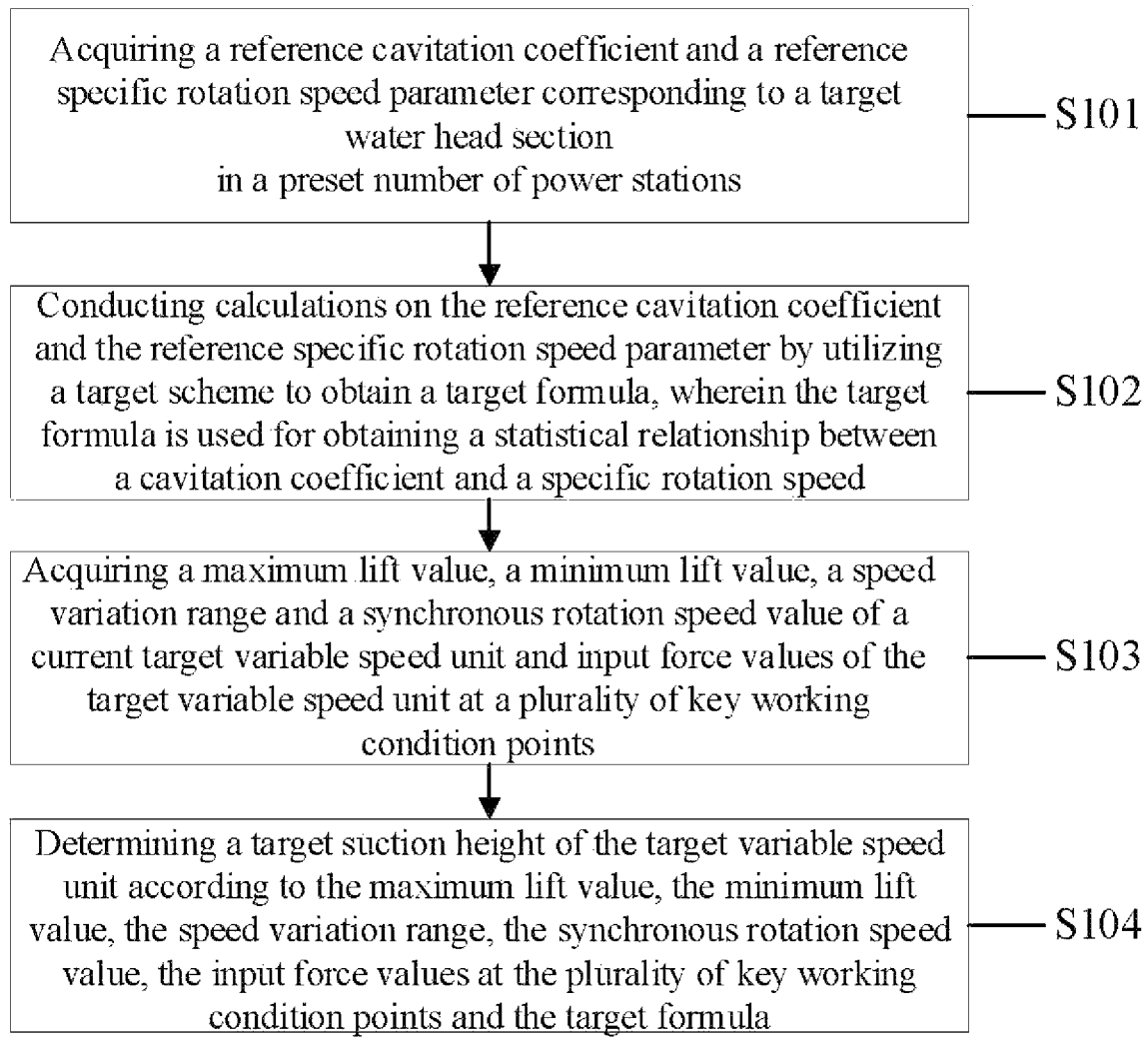
FIG. 1 is a schematic flow diagram of an optional method for determining a suction height of a variable speed unit according to an embodiment of the present application.

To enable those skilled in the art to better understand the solution of the present application, the technical solution in the embodiment of the present application will be clearly and completely described below in conjunction with the accompanying drawings in the embodiment of the present application. Obviously, the described embodiment is only apart of the embodiments of the present application, but not all of the embodiments. Based on the embodiments in this application, all other embodiments obtained by those skilled in the art without creative efforts shall fall within the scope of protection of this application.

It should be noted that the terms "first", "second", etc. in the description and claims of the present application and the accompanying drawings are used for distinguishing similar objects, but not necessarily used for describing a particular order or a chronological order. It is to be understood that the data so used are interchangeable under appropriate circumstances such that the embodiments of the present application described herein can be practiced in sequence other than those illustrated or described herein. Furthermore, the terms "comprising,", "having," and any other variation thereof, are intended to cover a non-exclusive inclusion, such that a process, method, system, product or apparatus that comprises a list of steps or elements is not necessarily limited to those steps or elements expressly listed, but may comprise other steps or elements not expressly listed or inherent to such process, method, product, or apparatus.

Because no variable speed unit is put into operation at present, a reliable calculation method for the cavitation coefficient and the suction height of the variable speed unit is not available. Selection of the cavitation coefficient in the design process can only refer to a determination mode of the constant-speed unit. However, the cavitation coefficient of the constant-speed unit can be determined just by determining the suction height according to the cavitation performance under one working condition with a minimum lift and a maximum flow. An increase of the rotation speed freedom degree of the variable speed unit changes the operation range of the pumping working condition from a line to a plane, the cavitation performance of multiple points within the whole operation range needs to be considered, and the requirement for the non-cavitation operation is higher.

Meanwhile, when an existing method for determining a cavitation coefficient of a constant-speed unit is applied to the design of the variable speed unit, the following problems exist:
1. Existing formulas for calculating a cavitation coefficient of a constant-speed unit are all derived from statistical formulas many years ago, and the criterion designed according to a critical cavitation coefficient before is changed into an initial cavitation coefficient so that calculation results of existing empirical formulas cannot reflect the progress of unit design and the research and development technologies in recent years.
2. The existing empirical formulas are all the statistical results of parameters of all the water head sections of the power station, and scheme argumentation, parameter optimization and hydraulic research and development of the unit at the water head section cannot be more accurately reflected.
3. The requirement for the cavitation index of the variable speed unit is higher. The power of the constant-speed unit can not be adjusted when the constant-speed unit operates, and the cavitation coefficient of a water pump only needs to meet the cavitation performance under one working condition with the maximum flow at the low water head to determine the suction height. However, an increase of the rotation speed freedom degree of the variable speed unit can enable the power of the pumping working condition to be adjustable, the operation range of the variable speed unit is changed from a line to a plane, and the pumping working condition is limited by cavitation of the back surface of a blade under the condition of low flow and high lift under the normal condition; and meanwhile, a large flow and a low lift are limited by the cavitation of a working surface of the blade, and the requirement for the non-cavitation operation is higher.

To solve the problems that a calculation result of a constant-speed unit is inaccurate and the requirement for calculating the current cavitation index cannot be met, the embodiment of the present application provides a method for determining a suction height of a variable speed unit, as shown in FIG. 1, the method comprises:

Step S101, acquiring a reference cavitation coefficient and a reference specific rotation speed parameter corresponding to a target water head section in a preset number of power stations;

Step S102, conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;

Step S103, acquiring a maximum lift, a minimum lift, a speed variation range and a synchronous rotation speed value of a current target variable speed unit and input force values of the target variable speed unit at a plurality of key working condition points;

Step S104, determining a target suction height of the target variable speed unit according to the maximum lift, the minimum lift, the speed variation range, the synchronous rotation speed value, the input force values at the plurality of key working condition points and the target formula.

Optionally, in the embodiment of the present application, according to an operating target water head section of the variable speed unit to be analyzed, for example, cavitation coefficients and specific rotation speed parameters of not less than a preset number of certain 400-meter water head sections are collected, such as the cavitation coefficients and specific rotation speed parameters of pumped storage power stations at the 10 water head sections that have been put into production, see Table 1, where the collected cavitation coefficients and specific rotation speed parameters of the pumped storage power stations at not less than 10 400-meter water head sections are shown in Table 1.

TABLE 1

| Name of power station | Specific rotation speed | Cavitation coefficient | Name of power station | Specific rotation speed | Cavitation coefficient |
|---|---|---|---|---|---|
| Yixing | 37.83 | 0.194 | Zhenan | 35.34 | 0.197 |
| Yimeng | 41.04 | 0.231 | Zhirui | 36.82 | 0.193 |
| Huilong | 34.74 | 0.145 | Xianju | 35.49 | 0.185 |
| Qingyuan | 37.85 | 0.222 | Kokura in Japan | 44.66 | 0.237 |
| Huanggou | 38.05 | 0.169 | Ninghai | 37.56 | 0.187 |
| Shenzhen | 37.91 | 0.177 | Qingyuan | 35.38 | 0.169 |
| Shisanling | 34.38 | 0.150 | Wendeng | 34.83 | 0.187 |
| The second phase of Fengning | 40.36 | 0.208 | Fukang | 33.51 | 0.176 |
| Panlong | 36.83 | 0.175 | Changyang | 39.26 | 0.189 |
| Xianyou | 37.82 | 0.176 | Meizhou | 39.7 | 0.186 | conduct calculations on the collected reference cavitation coefficient and reference specific rotation speed parameter by using the target scheme such as a power function regression analysis algorithm to obtain a target formula used for calculating a new statistical relationship between a cavitation coefficient and a specific rotation speed: $\sigma_p = 0.00172 n_q^{1.2955}$, wherein $\sigma_p$ indicates the cavitation coefficient in Table 1, $n_q$ is the specific rotation speed in Table 1, and $\sigma_p$ and $n_q$ in Table 1 are combined with the power function regression analysis algorithm to obtain the target formula.

It is required to acquire the maximum lift, the minimum lift, the speed variation range and the synchronous rotation speed value of the current target variable speed unit under the pumping working condition of the power station and input force values of the target variable speed unit at the plurality of key working condition points, and the target suction height of the target variable speed unit can be calculated and determined according to the maximum lift, the minimum lift, the speed variation range, the synchronous rotation speed value, the input force values at the plurality of key working condition points and the obtained target formula.

In the embodiment of the present application, obtain a reference cavitation coefficient and a reference specific rotation speed parameter corresponding to a target water head section in a preset number of power stations; conduct calculations on the reference cavitation coefficient and the reference specific rotation speed parameter by utilizing a target scheme to obtain a target formula, wherein the target formula is used for obtaining the statistical relationship between a cavitation coefficient and a specific rotation speed; acquire a maximum lift, a minimum lift, a speed variation range and a synchronous rotation speed value of a current target variable speed unit and input force values of the target variable speed unit at a plurality of key working condition points; and determine a target suction height of the target variable speed unit according to the maximum lift, the minimum lift, the speed variation range, the synchronous rotation speed value and the input force values at the plurality of key working condition points. Because the embodiment of the present application considers data from the pumped storage power station which is put into production in the target water head section where the variable speed unit is located, the statistical relationship between the cavitation coefficient and the specific rotation speed of the pumped storage unit at the water head section is obtained by adopting the target scheme, the cavitation coefficient of the pumped storage power station at the water head section can be estimated preliminarily and more accurately, the influence of variation of the variable speed operating range of the variable speed unit on cavitation is taken into account, and the cavitation coefficient and the suction height of the variable speed pumped storage unit power station are calculated more accurately. Compared with an existing design method adopting the constant-speed unit, the requirement of the variable speed unit on cavitation-free operation can be better met, and reliable technical support is provided for subsequent construction of the variable speed pumped storage power station.

As an optional embodiment, the conducting calculations on the reference cavitation coefficient and the reference specific rotation speed parameter by utilizing the target scheme to obtain a target formula comprises:
conducting calculations on a reference cavitation coefficient and a reference specific rotation speed parameter by utilizing a target scheme to obtain a first formula;
acquiring a plurality of preset formulas, wherein the preset formulas are existing calculation formulas for obtaining the statistical relationship between a cavitation coefficient and a specific rotation speed; and
numerically comparing the first formula to the plurality of preset formulas to select the target formula from the first formula and plurality of preset formulas.

Optionally, to determine a calculation formula with higher accuracy for characterizing a statistical relationship between a cavitation coefficient and a specific rotation speed, according to an embodiment of the present application, $\sigma_p = 0.00172 n_q^{1.2955}$ determined by utilizing the power function regression analysis algorithm and two preset formulas, such as an R. S. Stelzer formula and a Stepanov formula, are compared and calculated to obtain a standard deviation value, and the formula with the minimum standard deviation value is taken as a new formula adopted finally, namely the target formula.

Table 2 is a table of standard deviation calculations determined by three formulas:

TABLE 2

| Name of Formula | Expression | Sum of Squares of Fitting Errors |
|---|---|---|
| Fitting Formula | $\sigma_p = 0.00172 n_q^{1.2955}$ | 0.009875714 |
| R.S.Stelzer | $\sigma_p = 0.00137 n_q^{4/3}$ | 0.030735603 |
| Stepanov | $\sigma_p = 0.00121 n_q^{4/3}$ | 0.004896677 |

It can be seen from Table 2 that the newly fitted calculation formula for the cavitation coefficient of the 400-meter water head section has the minimum standard deviation and higher precision, and the cavitation coefficient of the variable speed unit is determined by using the calculation formula.

In an embodiment of the present application, by utilizing parameters of the pumped storage power station which has been put into operation at the actual water head section, the target scheme is used for carrying out regression fitting of a new cavitation coefficient statistical formula. By comparing with a standard deviation of an existing empirical formula, it is verified that an obtained curve can estimate the cavitation coefficient more accurately.

As an optional embodiment, the acquiring the maximum lift, the minimum lift, the speed variation range and the synchronous rotation speed value of the current target variable speed unit and the input force values of the target variable speed unit at the plurality of key working condition points comprises:

acquiring the maximum lift, the minimum lift, the speed variation range and the synchronous rotation speed value; and determining the input force values of the plurality of key working condition points according to the speed variation range, the synchronous rotation speed value and the preset relationship, wherein the preset relationship is used for indicating the input force of the target variable speed unit is in direct proportion to the third power of the rotation speed value.

Optionally, acquire the maximum lift, the minimum lift, the speed variation range and the synchronous rotation speed value of the current variable speed pumped storage unit power station under the pumping working condition. For example, the synchronous rotation speed value nr=428.6 r/min, the maximum lift $H_{p\ max}$=469 m, and the minimum lift $H_{p\ min}$=404 m; if the maximum lift $H_{p\ min}$=404 m, the rotation speed variation range is from −7% to +2%, and the rotation speed variation range is from 398.6 r/min t 438.1 r/min; if the maximum lift $H_{p\ max}$=469 m, the rotation speed variation range is from −2% to +4%, and the rotation speed variation range is from 421.8 r/min to 445.5 r/min.

Based on the above parameters, such as the maximum lift, the minimum lift, the speed variation range and the synchronous rotation speed value, and the preset relationship (or preset principle) that the input force of the target variable speed unit is in direct proportion to the third power of the rotation speed value, the maximum-lift minimum rotation speed, the maximum-lift maximum rotation speed, the minimum-lift minimum rotation speed and the minimum-lift maximum rotation speed of the variable speed unit and input force at the four key working condition points are calculated by referring to similar power station unit parameters, $P_{p\ min1}$=317.46 MW, $P_{p\ min2}$=215.4 MW, $P_{p\ max1}$=317.9 MW and $P_{p\ max2}$=268.7 MW. It should be noted that the embodiments of the present application include, but are not limited to, the input force at the four key working condition points.

As an optional embodiment, the determining the target suction height of the target variable speed unit according to the maximum lift, the minimum lift, the speed variation range, the synchronous rotation speed value, the input force values at the plurality of key working condition points and the target formula comprises:

determining flow values of the target variable speed unit at the plurality of key working condition points according to the input force values at the plurality of key working condition points;

obtaining a specific rotation speed value at each key working condition point according to the flow value, the maximum lift, the minimum lift, the synchronous rotation speed value and the speed variation range under each key working condition; and determining the target suction height according to the specific rotation speed value at each key working condition point and the target formula.

Optionally, according to the formula $$P = \frac{\rho g O H}{\eta},$$

the flow value Q of the target variable speed unit at each key working condition point is calculated to obtain a plurality of values Q, wherein P is the input force value at each above-mentioned key working condition point, $\rho$ is the water density, g is the gravity acceleration, H is the corresponding lift, and $\eta$ is unit efficiency. When the rotation speed is reduced to 398.6 r/min at the minimum lift, Q=50 m³/s; when the rotation speed is increased to 438.1 r/min at the minimum lift, Q=72 m³/s; when the rotation speed is calculated to be 421.8 r/min at the maximum lift, Q=52 m³/s; and when the rotation speed is calculated to be 445.5 r/min, Q=73.8 m³/s.

According to the flow value, the maximum lift, the minimum lift and the synchronous rotation speed value under each key working condition, the specific rotation speed value of the variable speed unit at each key working condition point is obtained. The calculation formula is: $n_q = n\sqrt{Q}$, wherein n is a corresponding actual rotation speed value at each key working condition point, Q is the flow value at each key working condition point, and H is the corresponding lift. At this time, the minimum and maximum values of the minimum-lift rotation speed are respectively as follows: $n_{qp\ min1}$=31.27, $n_{qp\ min2}$=41.25. The minimum and maximum values of the maximum-lift rotation speed are respectively as follows: $n_{qp\ max1}$=30.18, $n_{qp\ max2}$=37.97.

The four specific rotation speed values at the four working condition points are substituted into the above determined target formula $\sigma_p$==0.001721.2$n_q^{1.2955}$ to calculate cavitation coefficients at the four key working condition points, the cavitation coefficient maximum value at the maximum lift and the cavitation coefficient maximum value at the minimum lift are determined respectively, namely a first cavitation coefficient maximum value corresponding to the maximum lift within the speed variation range and a second cavitation coefficient maximum value corresponding to the minimum lift within the speed variation range, such as the minimum-lift cavitation coefficient maximum value $\sigma_{pp\ min}$=max[0.00172$n_{qp\ min1}^{1.2955}$, 0.00172$n_{qp\ min2}^{1.2955}$]=0.213 and the maximum-lift cavitation coefficient maximum value $\sigma_{pp\ max}$=max[0.00172$n_{qp\ min1}^{1.2955}$, 0.00172$n_{qp\ max2}^{1.2955}$]=−0.191.

According to the two obtained cavitation coefficients 0.213 and 0.191 and the suction height calculation formula $$H_s \leq 10 - \frac{\nabla}{900} - \sigma_p \times H,$$

the suction height minimum value is calculated, wherein H is the corresponding lift, ∇ is sea level elevation and is a fixed value of the current power station. That is:

$$H_s \leq \min\left[10 - \frac{\nabla}{900} - \sigma_{pp\ min} \times H_{p\ min}, 10 - \frac{\nabla}{900} - \sigma_{pp\ max} \times H_{p\ max}\right] =$$

$$\min[-77.2, -80.9] = -80.9$$

According to the embodiment of the present application, the influence of variation of the variable speed operating range of the variable speed unit on cavitation is considered, the calculation results are more reliable and comprehensive, and the cavitation coefficient and the suction height of the variable speed pumped storage unit power station are calculated more accurately.

As an optional embodiment, the obtaining the target suction height according to the suction height minimum value comprises:
  acquiring a preset margin value, wherein the preset margin value is used for numerically adjusting the suction height minimum value within a preset range; and
  determining the target suction height according to the suction height minimum value and the preset margin value.

Optionally, to make the determined target suction height better grounded and more consistent with the actual result. According to the present application, a preset margin value is set and used for numerically adjusting the suction height minimum value within the preset range, and the suction height minimum value is increased or decreased by the preset margin value to obtain the target suction height.

To make an application scene of the method for determining the suction height of the variable speed unit and the determination method more intuitive, in the embodiment Ume Gap Code of the present application, a certain 300-meter water head section pumped storage power station is taken as an explanation object for complete example illustration:

Step 1: collecting the cavitation coefficients and specific rotation speed parameters of the pumped storage power stations at about not less than 10 300-meter water head sections which are put into operation, as in the following table 3:

TABLE 3

| Name of power station | Specific rotation speed | Cavitation coefficient | Name of power station | Specific rotation speed | Cavitation coefficient |
|---|---|---|---|---|---|
| Minghu | 40.74 | 0.170 | Pushihe | 45.87 | 0.250 |
| Basimona | 27.88 | 0.123 | Jinzhai | 43.53 | 0.235 |
| Qingsong | 44.03 | 0.227 | Yixian | 42.89 | 0.249 |
| Heimifeng | 45.25 | 0.217 | Yixing | 37.83 | 0.195 |
| Zhanghewan | 41.86 | 0.195 | Yimeng | 41.04 | 0.231 |
| Huilong | 34.74 | 0.145 | Qingyuan | 37.85 | 0.222 |

Step 2: obtaining a new statistical relationship between the cavitation coefficient and the specific rotation speed according to the parameters collected in Step 1 through power function regression analysis: $\sigma_p = 0.00141 n_q^{1.34684}$;

Step 3: comparing a residual standard deviation of the new formula obtained in Step 2 with residual standard deviations obtained by utilizing the two empirical formulas such as the R. S. Stelzer formula and the Stepanov formula, wherein it can be seen from the table 4 below that the newly fitted calculation formula for the cavitation coefficient of the 300-meter water head section has the minimum standard deviation and higher precision, and the cavitation coefficient of the variable speed unit is determined by using the calculation formula.

TABLE 4

| Name of Formula | Expression | Sum of Squares of Fitting Errors |
|---|---|---|
| Fitting Formula | $\sigma_p = 0.00141 n_q^{1.34684}$ | 0.005350604 |
| R.S. Stelzer | $\sigma_p = 0.00137 n_q^{4/3}$ | 0.008130191 |
| Stepanov | $\sigma_p = 0.00121 n_q^{4/3}$ | 0.02238139 |

Step 4: determining the analyzed maximum lift, minimum lilt, speed variation range, synchronous rotation speed and maximum input force of the variable speed pumped storage unit power station under the pumping working condition. The synchronous rotation speed nr=375 r/min, the maximum lift $H_{p\ max}$=396 m, and the maximum lift $H_{p\ min}$=340.2 m; when the minimum lift is calculated to be $H_{p\ min}$=340.2 m, the rotation speed variation range is from −5% to +1.8%, that is, the rotation speed variation range is from 356.25 r/min to 381.75 r/min; and when the maximum lift is calculated to be $H_{p\ max}$=396 m, the rotation speed variation range is from −2% to +4.2%, that is, the rotation speed variation range is from 367.5 r/min to 390.75 r/min.

Step 5: according to the parameters in Step 4 and the principle that the input force of the variable speed operating unit is in direct proportion to the third power of the rotation speed, calculating the input force values: $P_{p\ min1}$=317.81 MW, $P_{p\ min2}$=242.47 MW, $P_{p\ max1}$=317.46 MW and $P_{p\ max2}$=245.61 MW at the four key working condition points such as the maximum-lift minimum rotation speed, the maximum-lift maximum rotation speed, the minimum-lift minimum rotation speed and the minimum-lift maximum rotation speed of the variable speed unit by referring to the parameters of the similar power station units.

$$P = \frac{\rho g Q H}{\eta},$$

Step 6: based on the input force calculated in Step 5, according to 7 calculating a flow rate Q at the variable speed operating working condition point. When the rotation speed is reduced to 356.25 r/min at the minimum lift, Q=66.11 m³/s; when the rotation speed is increased to 381.75 r/min at the minimum lift, Q=84.63 m³/s; when the maximum-lift rotation speed is calculated to be 367.5 r/min, Q=58.17 m³/s; and when the maximum-lift rotation speed is calculated to be 390.75 r/min, Q=76.93 m³/s.

Step 7: according to the parameters in Step 4 and Step 6 and the specific rotation speed formula $n_q = n\sqrt{Q}$, determining the specific rotation speeds of the variable speed units at the four key working condition points. The minimum and maximum values of the minimum-lift rotation speed are respectively as follows: $n_{qp\ min1}$=44.33, $n_{qp\ min2}$=36.57. The minimum and maximum values of the maximum-lift rotation speed are respectively as follows: $n_{qp\ max1}$=31.57, $n_{qp\ max2}$=38.61;

Step 8: according to the specific rotation speeds at the four working condition points obtained in Step 7 and the cavitation coefficient calculation formula $\sigma_p = 0.00141 n_q^{1.34684}$ obtained in Step 3, calculating cavitation coefficients at the four key working condition points and respectively determining a maximum-lift maximum value and a minimum-lift maximum value; a larger value of the minimum-lift cavitation coefficient $\sigma_{pp\ min}=\max[0.00141n34684, 0.00141n_{qp\ min2}^{1.34684}]=0.233$ and and the maximum lift $\sigma_{pp\ max}=\max[0.00141n_{qp\ max1}^{1.34684}, 0.00141n_{qp\ max2}^{1.34684}]=0.0193$ Step 9: according to the two cavitation coefficients obtained in Step 8 and the suction height calculation formula $$H_s \le 10 - \frac{\nabla}{900} - \sigma_p \times H,$$

calculating a suction height minimum value. That is:

$$H_s \le \min\left[10 - \frac{\nabla}{900} - \sigma_{pp\ min} \times H_{p\ min}, 10 - \frac{\nabla}{900} - \sigma_{pp\ max} \times H_{p\ max}\right] = \min[-69.52, -66.85] = -69.52$$

Step 10: according to the suction height −69.52 m obtained in Step 9, by considering a certain allowance, determining the final suction height of the power station.

According to the above embodiments, based on the precision improvement of the conventional constant-speed unit suction height calculation method and operating characteristics of the variable speed unit, the method for determining the suction height of the variable speed unit is proposed. The adopted methods are all mature theories, can be used for predicting cavitation coefficients of a variable speed water pump turbine, a variable speed pump and a variable speed water turbine and provides scientific support for the determination of a reasonable suction height.

It should be noted that, for the convenience of description, the foregoing method embodiments are all described as a series of action combinations, but those skilled in the art should know that the present application is not limited by the described action sequence, following the present application, certain steps may be performed in other orders or concurrently. Secondly, those skilled in the art should also know that the embodiments described in the specification are all preferred embodiments, and the actions and modules involved are not all necessary to the present application.

Through the above description of the implementations, those skilled in the art can clearly understand that the method based on the above embodiments can be implemented by utilizing software plus a necessary general-purpose hardware platform, and of course also by hardware. However, in many cases, the former is the better implementation. Based on such understanding, the technical solution of the present application, which is essential or contributes to the prior art, may be embodied in the form of a software product. The computer software product is stored in a storage medium (such as Read-Only Memory (ROM)/Random Access Memory (RAM), a magnetic disk and an optical disk), including a plurality of instructions for enabling a terminal device (which may be a phone, a computer, a server, or a network device, etc.) to perform the methods of the embodiments of the present application.

Figure 2:
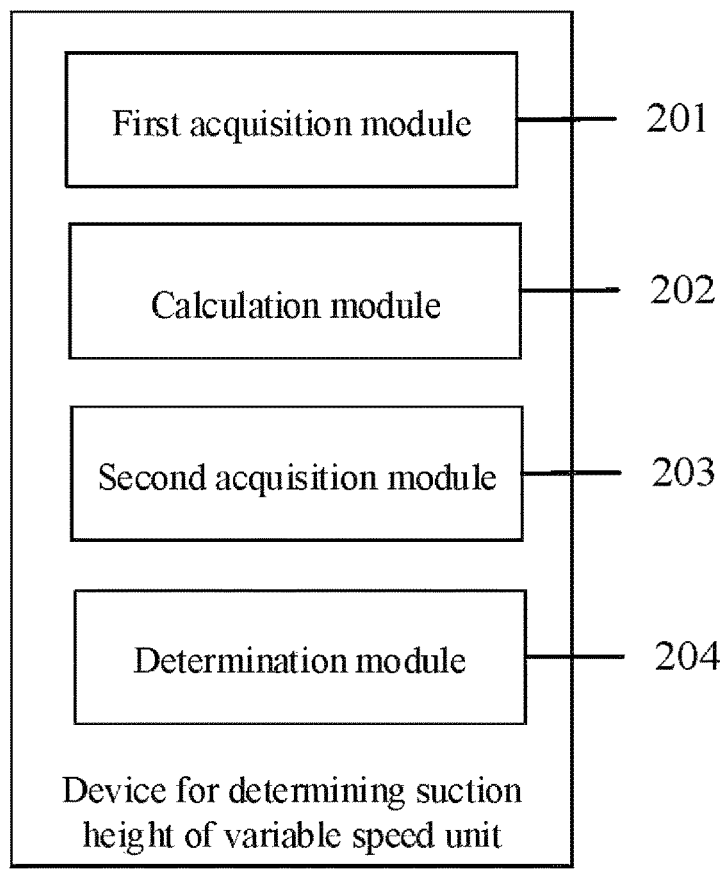
FIG. 2 is a structural block diagram of an optional device for determining a suction height of a variable speed unit according to an embodiment of the present application.

According to another aspect of an embodiment of the present application, a device for determining a suction height of a variable speed unit is also provided for performing the foregoing method for determining the suction height of the variable speed unit. FIG. 2 is a structural block diagram of an optional device for determining a suction height of a variable speed unit according to an embodiment of the present application. As shown in FIG. 2, the device can comprise:
a first acquisition module 201 for acquiring a reference cavitation coefficient and a reference specific rotation speed parameter corresponding to a target water head section in a preset number of power stations;
a calculation module 202 for conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;
a second acquisition module 203 for acquiring a maximum lift, a minimum lift, a speed variation range and a synchronous rotation speed value of a current target variable speed unit and input force values of the target variable speed unit at a plurality of key working condition points; and
a determination module 204 for determining a target suction height of the target variable speed unit according to the maximum lift, the minimum lift, the speed variation range, the synchronous rotation speed value, and the input force values at the plurality of key working condition points and the target formula.

It should be noted that the first acquisition module 201 in the embodiment can be used for performing Step S101, the calculation module 202 in the embodiment can be used for performing Step S102, the second acquisition module 203 in the embodiment can be used for performing the Step S103, and the determination module 204 in the embodiment can be used for performing the Step S104.

Through the modules, the data of the pumped storage power station which is put into production in the target water head section where the variable speed unit is located are considered. As the statistical relationship between the cavitation coefficient and the specific rotation speed of the pumped storage unit at the water head section is obtained by utilizing the target scheme, the cavitation coefficient of the pumped storage power station at the water head section can be preliminarily estimated more accurately, the influence of variation of the variable speed operating range of the variable speed unit on cavitation is considered, and the cavitation coefficient and the suction height of the variable speed pumped storage unit power station are calculated more accurately. Compared with an existing design method adopting the constant-speed unit, the requirement of the variable speed unit on cavitation-free operation can be better met, and reliable technical support is provided for subsequent construction of the variable speed pumped storage power station.

As an optional embodiment, the calculation module comprises:
a calculation unit for conducting calculations on the reference cavitation coefficient and the reference specific rotation speed parameter by utilizing the target scheme to obtain a first formula;
a first acquisition unit for acquiring a plurality of preset formulas, wherein the preset formulas are existing calculation formulas for obtaining the statistical relationship between the cavitation coefficient and the specific rotation speed; and
a comparison unit for numerically comparing the first formula to the plurality of preset formulas to select the target formula from the first formula and the plurality of formulas.

As an optional embodiment, the comparison unit comprises:
- a first determination submodule for determining a corresponding first standard deviation according to the first formula;
- a second determination submodule for determining a preset standard deviation corresponding to each preset formula according to the plurality of preset formulas; and
- a comparison submodule for numerically comparing the first formula to the preset standard deviation, and selecting the obtained formula with the minimum standard deviation as the target formula.

As an optional embodiment, the second acquisition module comprises:
- a second acquisition unit for acquiring the maximum lift, the minimum lift, the speed variation range and the synchronous rotation speed value; and
- a first determination unit for determining the input force values at the plurality of key working condition points according to the speed variation range, the synchronous rotation speed value and a preset relationship, wherein the preset relationship is used for indicating the input force of the target variable speed unit to be in direct proportion to the third power of the rotation speed value.

As an optional embodiment, the determination module comprises:
- a second determination unit for determining flow values of the target variable speed unit at the plurality of key working condition points according to the input force values at the plurality of key working condition points;
- an obtaining unit for obtaining a specific rotation speed value at each key working condition point according to the flow value, the maximum lift, the minimum lift, the synchronous rotation speed value and the speed variation range under each key working condition; and
- a third determination unit for determining the target suction height according to the specific rotation speed value at each key working condition point and the target formula.

As an optional embodiment, the third determination unit comprises:
- a third determination submodule for determining a first cavitation coefficient maximum value corresponding to the maximum lift within the speed variation range and a second cavitation coefficient maximum value corresponding to the minimum lift within the speed variation range according to the specific rotation speed value at each key working condition point target formula;
- a first obtaining submodule for obtaining a suction height minimum value according to the first cavitation coefficient maximum value, the second cavitation coefficient maximum value and the suction height calculation formula; and
- a second obtaining submodule for obtaining a target suction height according to the suction height minimum value.

As an optional embodiment, the second obtaining submodule comprises:
- an acquisition subunit for acquiring a preset margin value, wherein the preset margin value is used for numerically adjusting the suction height minimum value within a preset range; and
- a determination subunit for determining the target suction height according to the suction height minimum value and the preset margin value.

According to yet another aspect of an embodiment of the present application, electronic equipment for implementing the method for determining the suction height of the variable speed unit is also provided. The electronic equipment may be a server, a terminal, or a combination thereof.

Figure 3:
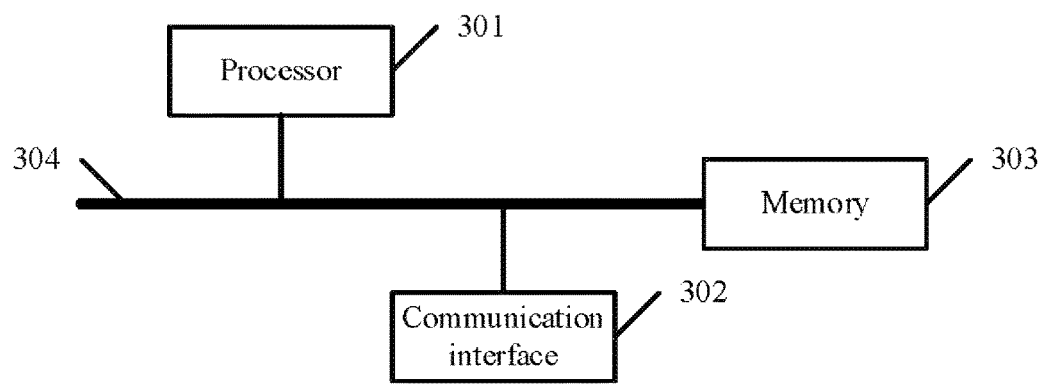
FIG. 3 is a structural block diagram of optional electronic equipment according to an embodiment of the present application.

FIG. 3 is a structural block diagram of optional electronic equipment according to an embodiment of the present application. As shown in FIG. 3, the electronic equipment comprises a processor 301, a communication interface 302, a memory 303 and a communication bus 304, wherein the processor 301, the communication interface 302 and the memory 303 communicate with each other through the communication bus 304, wherein the memory 303 is configured to store a computer program; and
the processor 301 is configured to perform the computer program stored in the memory 303, implementing the following steps:
acquiring a reference cavitation coefficient and a reference specific rotation speed parameter corresponding to a target water head section in a preset number of power stations;
conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;
acquiring a maximum lift, a minimum lift, a speed variation range and a synchronous rotation speed value of a current target variable speed unit and input force values of the target variable speed unit at a plurality of key working condition points; and
determining a target suction height of the target variable speed unit according to the maximum lift, the minimum lift, the speed variation range, the synchronous rotation speed value, the input force values at the plurality of key working condition points and the target formula.

Optionally, in the embodiment of the present application, the communication bus may be a Peripheral Component Interconnect (PCI) bus, or an Extended Industry Standard Architecture (EISA) bus, etc. The communication bus may be an address bus, a data bus, a control bus, etc. For the convenience of illustration, the communication bus is shown just by a thick line in FIG. 3, but it does not mean only one bus or one type of bus.

The communication interface is used for communication between the electronic equipment and other equipment.

The memory may include RAM, and may also comprise a non-volatile memory, for example, at least one magnetic disk memory. Optionally, the memory may also be at least one memory device located remotely from the processor.

As an example, as shown in FIG. 3, the memory 303 may include, by is not limited to, the first acquisition module 201, the calculation module 202, the second acquisition module 203 and the determination module 204 in the device for determining the suction height of the variable speed unit. In addition, the memory may also include but is not limited to, other module units in the device for determining the suction height of the variable speed unit.

The processor may be a general-purpose processor, may include, by is not limited to, a Central Processing Unit (CPU), a Network Processor (NP), etc., and may also be a Digital Signal Processing (DSP), an Application Specific Integrated Circuit (ASIC), a Field-Programmable Gate Array (FPGA) or other programmable logic devices, a discrete or transistor logic device and a discrete hardware component.

Further, the electronic equipment comprises a display for displaying a result of determining the suction height of the variable speed unit.

Optionally, the specific example in the embodiment may refer to the example described in the above embodiment, which is not described again in this embodiment.

Those skilled in the art can understand the structure shown in FIG. 3 is only for illustration. The equipment that implements the method for determining the suction height of the variable speed unit may be a terminal device, which may be a smartphone (such as an Android phone, an iOS phone, etc.), a tablet computer, a handheld computer, Mobile Internet Devices (MID), PAD and other terminal devices. FIG. 3 does not limit the structure of the above-mentioned electronic equipment. For example, the terminal device may also include more or fewer components (such as a network interface, a display device, etc.) shown in FIG. 3, or has different configurations shown in FIG. 3.

Those skilled in the art may understand that all or part of the steps in the methods of the above embodiments may be implemented by a program instructing hardware associated with the terminal device, where the program may be stored in a computer-readable storage medium, and the storage medium may include: flash disk, ROM, RAM, magnetic or optical disk, and the like.

According to yet another aspect of the embodiment of the present application, a storage medium is also provided. Optionally, in this embodiment, the storage medium may be used for executing program codes of the method for determining the suction height of the variable speed unit.

Optionally, in this embodiment, the storage medium may be located on at least one network device among a plurality of network devices in a network shown in the above embodiment.

Optionally, in this embodiment, the storage medium is configured to store the program codes for performing the following steps:
  acquiring a reference cavitation coefficient and a reference specific rotation speed parameter corresponding to a target water head section in a preset number of power stations;
  conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;
  acquiring a maximum lift, a minimum lift, a speed variation range and a synchronous rotation speed value of a current target variable speed unit and input force values of the target variable speed unit at a plurality of key working condition points; and
  determining a target suction height of the target variable speed unit according to the maximum lift, the minimum lift, the speed variation range, the synchronous rotation speed value, the input force values at the plurality of key working condition points and the target formula.

Optionally, the specific example in the embodiment may refer to the example described in the above embodiment, which is not described again in this embodiment.

Optionally, in the embodiment, the storage medium may include but is not limited to, various mediums capable of storing the program codes, such as a U disk, a ROM, a RAM, a mobile hard disk drive, a magnetic or an optical disk.

According to yet another aspect of the embodiment of the present application, a computer program product or a computer program is also provided. The computer program product or the computer program comprises computer instructions which are stored in a computer-readable storage medium; a processor of computer equipment reads the computer instructions from the computer-readable storage medium and executes the computer instructions so that the computer equipment performs the steps of the method for determining the suction height of the variable speed unit in any of the above-mentioned embodiment.

The serial numbers in the embodiments of the present application are only for description and do not represent the merits of the embodiments.

The integrated unit in the above embodiments, if implemented in the form of software functional units and sold or used as separate products, may be stored in the computer-readable storage medium. Based on such understanding, the technical solution of the present application is essentially a part that contributes to the prior art or all or part of the technical solution can be embodied in the form of a software product, which is stored in a storage medium, including some instructions for causing a or a plurality of computer devices (which may be a personal computer, a server, or a network device) to perform all or part of the steps of the method for determining the suction height of the variable speed unit in each embodiment of the present application.

In the embodiments of the present application, the embodiments are described with different emphases. The parts that are not described in detail in a certain embodiment can refer to related descriptions of other embodiments.

In the several embodiments provided in the present application, it should be understood that the disclosed client may be implemented in other manners. The embodiments of the devices described above are only illustrative. For example, the division of units is only a logical function division. In actual implementation, there may be other division methods. For example, multiple units or components may be combined or integrated into another system, or some features may be omitted, or not implemented. In addition, displayed or discussed mutual coupling or direct coupling or communication connection may be indirect coupling or communication connection through some interfaces, units or modules, and may be in electrical or other forms.

The units described as separate components may or may not be physically separated, and components displayed as units may or may not be physical units, that is, they may be located in one place or may be distributed on multiple network units. Some or all of the units may be selected according to actual needs to achieve the purposes of the schemes provided in the embodiments of the present application.

In addition, the functional units in the various embodiments of the present application may be integrated into one processing unit, or each unit may exist alone physically, or two or more units may be integrated into one unit. The integrated units may be realized in the form of hardware and may also be realized in the form of a software functional unit.

The foregoing is only a preferred implementation of the present application. It should be noted that those skilled in the art can make lots of improvements and modifications without departing from the principle of the present application, and these improvements and modifications should also be considered as the protection scope of the present application.

What is claimed is:

1. A method for determining a suction height of a variable speed unit, comprising the following steps:
    acquiring a reference cavitation coefficient and a reference specific rotation speed parameter corresponding to a target water head section in a preset number of power stations;
    conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;
    acquiring a maximum lift value, a minimum lift value, a speed variation range and a synchronous rotation speed value of a current target variable speed unit and input force values of the target variable speed unit at a plurality of key working condition points; and
    determining a target suction height of the target variable speed unit according to the maximum lift value, the minimum lift value, the speed variation range, the synchronous rotation speed value, the input force values at the plurality of key working condition points, and the target formula,
    wherein the determining the target suction height of the target variable speed unit according to the maximum lift value, the minimum lift value, the speed variation range, the synchronous rotation speed value, the input force values at the plurality of key working condition points and the target formula comprises:
    determining flow values of the target variable speed unit at the plurality of key working condition points according to the input force values at the plurality of key working condition points;
    obtaining a specific rotation speed value at each key working condition point according to the flow value under each key working condition, the maximum lift, the minimum lift, the synchronous rotation speed value and the speed variation range; and
    determining the target suction height according to the specific rotation speed value at each key working condition point and the target formula;
    wherein the determining the target suction height according to the specific rotation speed value at each key working condition point and the target formula comprises:
    determining a first cavitation coefficient maximum value corresponding to the maximum lift within the speed variation range and a second cavitation coefficient maximum value corresponding to the minimum lift within the speed variation range according to the specific rotation speed value at each key working condition point and the target formula;
    obtaining a suction height minimum value according to the first cavitation coefficient maximum value, the second cavitation coefficient maximum value and a suction height calculation formula; and
    obtaining the target suction height according to the suction height minimum value.

2. The method according to claim 1, wherein the conducting calculations on the reference cavitation coefficient and the reference specific rotation speed parameter by utilizing the target scheme to obtain the target formula comprises:
    conducting calculations on the reference cavitation coefficient and the reference specific rotation speed parameter by utilizing the target scheme to obtain a first formula;
    acquiring a plurality of preset formulas, wherein the preset formulas are existing calculation formulas for obtaining the statistical relationship between the cavitation coefficient and the specific rotation speed; and
    numerically comparing the first formula to the plurality of preset formulas to select the target formula from the first formula and the plurality of preset formulas.

3. The method according to claim 2, wherein the numerically comparing the first formula to the plurality of preset formulas to select the target formula from the first formula and the plurality of preset formulas comprises:
    determining a corresponding first standard deviation according to the first formula;
    determining a preset standard deviation corresponding to each preset formula according to the plurality of preset formulas; and
    numerically comparing the first formula to the preset standard deviation, and selecting the obtained formula with the minimum standard deviation as the target formula.

4. The method according to claim 1, wherein the acquiring the maximum lift value, the minimum lift value, the speed variation range and the synchronous rotation speed value of the current target variable speed unit and the input force values of the target variable speed unit at the plurality of key working condition points comprises:
    acquiring the maximum lift value, the minimum lift value, the speed variation range and the synchronous rotation speed value;
    and determining the input force values of the plurality of key working condition points according to the speed variation range, the synchronous rotation speed value and a preset relationship, wherein the preset relationship is the input force of the target variable speed unit being directly proportional to the third power of the rotation speed value.

5. The method according to claim 1, wherein the obtaining the target suction height according to the suction height minimum value comprises:
    determining the target suction height according to the suction height minimum value and a preset allowance.

6. A device for determining a suction height of a variable speed unit, comprising:
    a first acquisition module for acquiring a reference cavitation coefficient and a reference specific rotation speed parameter corresponding to a target water head section in a preset number of power stations;
    a calculation module for conducting calculations on the reference cavitation coefficient and the reference specific rotation speed parameter by utilizing a target scheme to obtain a target formula, wherein the target formula is used for obtaining a statistical relationship between a cavitation coefficient and a specific rotation speed;
    a second acquisition module for acquiring a maximum lift value, a minimum lift value, a speed variation range and a synchronous rotation speed value of a current target variable speed unit and input force values of the target variable speed unit at a plurality of key working condition points; and
    a determination module for determining a target suction height of the target variable speed unit according to the maximum lift value, the minimum lift value, the speed variation range, the synchronous rotation speed value, the input force values at the plurality of key working condition points and the target formula, wherein the determination module comprises a second determination unit for determining flow values of the target variable speed unit at the plurality of key working condition points according to the input force values at the plurality of key working condition points; an obtaining unit for obtaining a specific rotation speed value at each key working condition point according to the flow value, the maximum lift, the minimum lift, the synchronous rotation speed value and the speed variation range under each key working condition; and a third determination unit for determining the target suction height according to the specific rotation speed value at each key working condition point and the target formula, wherein the third determination unit comprises a third determination submodule for determining a first cavitation coefficient maximum value corresponding to the maximum lift within the speed variation range and a second cavitation coefficient maximum value corresponding to the minimum lift within the speed variation range according to the specific rotation speed value at each key working condition point and the target formula, a first obtaining submodule for obtaining a suction height minimum value according to the first cavitation coefficient maximum value, the second cavitation coefficient maximum value and the suction height calculation formula, and a second obtaining submodule for obtaining the target suction height according to the suction height minimum value.

\* \* \* \* \*